United States Patent
Schultz et al.

(10) Patent No.: US 8,839,397 B2
(45) Date of Patent: Sep. 16, 2014

(54) END POINT CONTEXT AND TRUST LEVEL DETERMINATION

(75) Inventors: Paul T. Schultz, Colorado Springs, CO (US); Mark J. Hahn, Stow, MA (US); David C Robbins, Grafton, MA (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 707 days.

(21) Appl. No.: 12/975,764

(22) Filed: Dec. 22, 2010

(65) Prior Publication Data

US 2012/0054847 A1    Mar. 1, 2012

Related U.S. Application Data

(63) Continuation-in-part of application No. 12/861,981, filed on Aug. 24, 2010.

(51) Int. Cl.
  *H04L 29/06*    (2006.01)
  *G06F 21/33*    (2013.01)
  *H04L 9/32*    (2006.01)

(52) U.S. Cl.
  CPC .............. *H04L 9/3213* (2013.01); *G06F 21/33* (2013.01); *G06F 2221/2137* (2013.01); *G06F 2221/2111* (2013.01)
  USPC .......................................................... 726/9

(58) Field of Classification Search
  USPC .......................................................... 726/9
  See application file for complete search history.

(56) References Cited

U.S. PATENT DOCUMENTS

| | | |
|---|---|---|
| 6,771,605 B1 | 8/2004 | Law et al. |
| 6,892,307 B1 * | 5/2005 | Wood et al. ........................ 726/8 |
| 7,711,117 B1 * | 5/2010 | Rohrle et al. .................. 380/270 |
| 2004/0029576 A1 | 2/2004 | Flykt et al. |
| 2004/0128546 A1 * | 7/2004 | Blakley et al. ................ 713/201 |
| 2005/0108551 A1 * | 5/2005 | Toomey ......................... 713/185 |
| 2008/0066175 A1 * | 3/2008 | Dillaway et al. ................ 726/21 |
| 2009/0055398 A1 | 2/2009 | Zhu et al. |
| 2010/0125732 A1 * | 5/2010 | Cha et al. ....................... 713/166 |
| 2010/0199332 A1 * | 8/2010 | Bachmann et al. ................ 726/4 |
| 2011/0078229 A1 | 3/2011 | Qiu et al. |
| 2011/0179477 A1 * | 7/2011 | Starnes et al. ..................... 726/9 |

FOREIGN PATENT DOCUMENTS

EP    2007097 A1 * 12/2008

* cited by examiner

*Primary Examiner* — Michael S McNally

(57) ABSTRACT

A server device is configured to receive, from a proxy server, a request by a user device to access a network; obtain information associated with the user device that includes an identifier associated with the user device and context information associated with the user device; determine a level of trust associated with the user device based on the identifier and the context information, where the level of trust is a measure of security risk associated with the user device; generate an access token based on the level of trust, where the access token identifies a level at which the user device is authorized to access the network; and send, to the user device via the proxy server, the access token that enables the proxy server to authorize the user device to access the network at the level identified by the access token.

22 Claims, 7 Drawing Sheets

400 →

| | Device Info (402) | Application ID (404) | User Info (406) | Carrier ID (408) | Device ID source (410) | Servicing ID (412) | Location Info (414) | Account State (416) | Network Access Point (418) | Policy Info (420) |
|---|---|---|---|---|---|---|---|---|---|---|
| 422 | MDN1 | APP1 | User1 | Carrier1 | Carrier1 | IMS1 | Location A | Premier standing | APN 1 / PDN 1 | authorized/ permitted |
| 424 | MDN2 | APP2 | User2 | carrier2 | Carrier1 block | IMS2 | Location B | Good standing | APN 2 / PDN 1 | authorized/ permitted |
| 426 | address1 | APP2 | | Carrier 3 | 3rd party | BS1 | Location D | suspended | Gateway 1 | authorized/ not permitted |
| 428 | SIP URI | | | Carrier2 | | BS2 | | | APN 2 | not authorized / not permitted |

FIG. 4

| | | SCORE 610-1 | | SCORE 610-2 | | SCORE 610-P |
|---|---|---|---|---|---|---|
| 402 — Device Info | MDN1 | 1 | MDN2 | 1 | ADDRESS1 | 1 |
| 404 — Application ID | APP1 | 1 | APP2 | 1 | APP2 | 1 |
| 406 — User Info | USER1 | 1 | USER2 | 1 | | 0 |
| 408 — Carrier identifier | CARRIER1 | 1 | CARRIER1 | 0 | CARRIER3 | 0 |
| 410 — Device ID source | CARRIER ISSUED | 1 | BLOCK | 0 | 3RD PARTY | 0 |
| 412 — Service identifier | IMS1 | 1 | IMS2 | 1 | BS2 | 1 |
| 414 — Location Info | LOCATION A | 1 | LOCATION B | 1 | LOCATION D | -1 |
| 416 — Account State | PREMIER STANDING | 1 | GOOD STANDING | 0 | SUSPENDED | -1 |
| 418 — Network Access Point | APN1/PDN1 | 1 | APN2/PDN1 | 1 | GATEWAY1 | 1 |
| 420 — Policy Info | AUTHORIZE / PERMITTED | 1 | AUTHORIZE / PERMITTED | 1 | AUTHORIZED / NOT PERMITTED | 1 |
| | LEVEL OF TRUST 620-1 | 10 | LEVEL OF TRUST 620-2 | 7 | LEVEL OF TRUST 620-Q | 3 |

END POINT CONTEXT AND TRUST LEVEL DETERMINATION

REFERENCE TO RELATED APPLICATION

This application is a continuation-in-part of U.S. patent application Ser. No. 12/861,981, filed Aug. 24, 2010, the entire contents of the application being incorporated herein by reference.

BACKGROUND

Today's user devices are capable of using applications that provide an ever-increasing variety of services that continue to improve the user's experience. Many of today's applications can be downloaded to a user device and can be used to communicate with other applications (e.g., service provider applications, third party applications, etc.) hosted by service provider networks and/or other networks (e.g., the Internet) in order to receive information and/or services.

Sometimes it is difficult for a service provider network to verify the source and/or trustworthiness of a user device, a user of the user device, a network, and/or an application that is seeking to gain access to and/or information associated with the service provider network. By not knowing and/or verifying the source and/or trustworthiness of the user device, the user, the network, and/or the application seeking to access the service provider network, the service provider network may become vulnerable to an unknown and/or nefarious user device, user, network, and/or application. The unknown and/or nefarious user device, user, network, and/or application may introduce a virus, harmful data, and/or malicious software into the service provider network, which may cause network operations to be disrupted. The unknown and/or nefarious user device, user, network, and/or application may also gain unauthorized access to information associated with the service provider network and/or utilize network resources to which the unknown and/or nefarious user device, user, network, and/or application are not entitled.

BRIEF DESCRIPTION OF THE DRAWINGS

FIG. 4 is a diagram of an example end point device context data structure according to an implementation described herein;

FIG. 6 is a diagram of an example trust level data structure according to an implementation described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the embodiments.

Systems and/or methods, described herein, may enable a trust level application (hereinafter referred to as "trust application") to obtain context information associated with a user device and to use the context information and/or information associated with the user device to identify a level of trust to be assigned to the user device. The trust application may use the identified level of trust to determine whether and/or at what level the user device is to be granted access to a network. The trust application may also, or alternatively, use the identified level of trust to determine whether a potential security event, associated with the network, has occurred that may cause the trust application to perform a containment operation in order to avoid and/or minimize effects caused by the security event. The trust application may communicate with a proxy server that enables the identified level of trust to be determined and/or maintained with the user device. The trust application may communicate with the proxy server in the event that the potential security event has been detected, in order to prevent the security event from compromising the security and/or data associated with the network.

Figure 1:
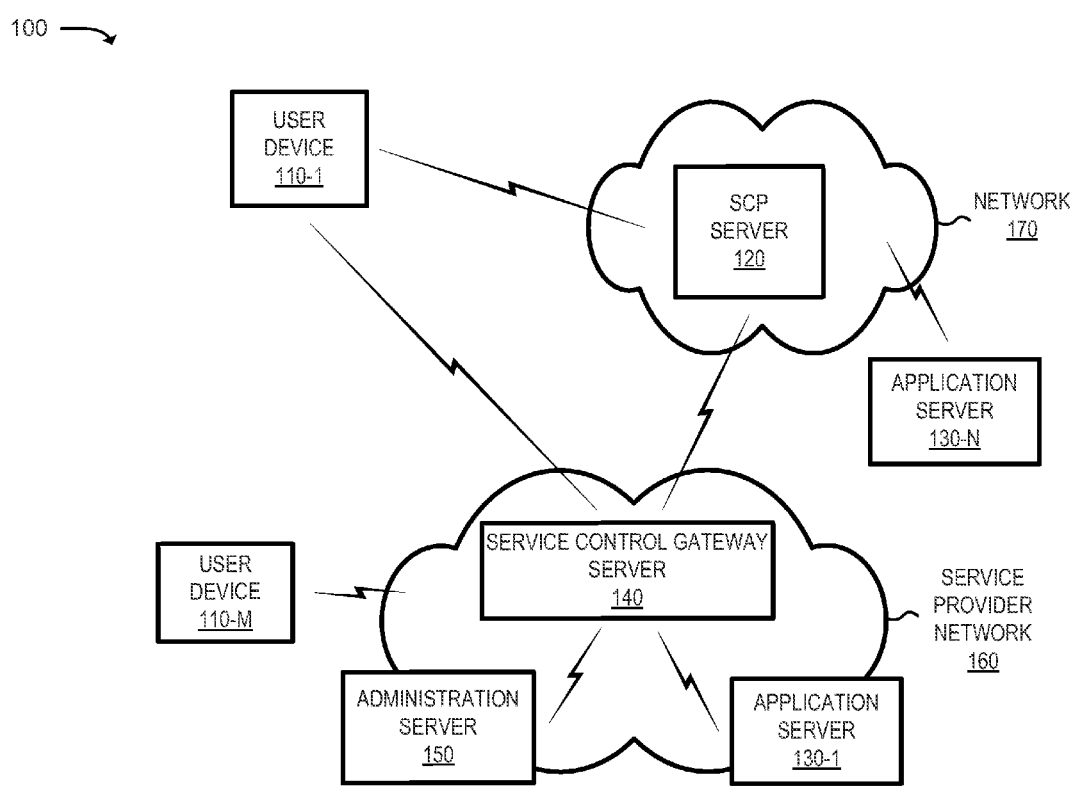
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a group of user devices 110-1, . . . , 110-M (M>1) (hereinafter referred to collectively as "user devices 110" and individually as a "user device 110"), a security and containment proxy server 120 (hereinafter referred to as a "SCP 120"), a group of application servers 130-1, . . . 130-N (N>1) (hereinafter referred to collectively as "application servers 130" and individually as an "application server 130"), a service control gateway server 140 (hereinafter referred to as "SCGW 140"), an administration (or "administrative") server 150, a service provider network 160, and a network 170. The number of devices and/or networks, illustrated in FIG. 1, is provided for explanatory purposes only. In practice, there may be additional devices and/or networks, fewer devices and/or networks, different devices and/or networks, or differently arranged devices and/or networks than illustrated in FIG. 1.

Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

User device 110 may include any computation or communication device that is capable of communicating via service provider network 160 and/or network 170. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a landline telephone, a laptop computer, a tablet computer, a personal computer, a set top box (STB), a television, a camera, a personal gaming system, a sensor or another type of computation or communication device. The description to follow will generally refer to user device 110 as a wireless mobile device. The description is not limited, however, to a wireless mobile device and may equally apply to other types of user devices.

User device 110-1 may host a device application that may be used to obtain services from a service provider application (e.g., hosted by application server 130-1) and/or a third party application (e.g., hosted by application server 130-N). For example, user device 110-1 may send a request, to receive the services, to application server 130. The request may include information associated with user device 110, such as a device identifier (e.g., a mobile directory number (MDN), a landline directory number (LDN), a subscriber identity module (SIM) universal resource identifier (URI), an international mobile subscriber identity (IMSI), an international mobile equipment identity (IMEI), a CODEC, etc.). Additionally, or alternatively, the information associated with user device 110 may include an address associated with user device 110 (e.g., a media access control (MAC) address, an Internet protocol (IP) address, a uniform resource locator (URL), etc.), information associated with a user of user device 110 (e.g., a username, password, personal identification number (PIN), biometric information, etc.), and/or information associated with the device application (e.g., an application identifier, a license file, an indication of whether the application is certified by an application certifying entity, such as Verisign®, etc.).

SCP 120 may include one or more server devices, or other types of computation or communication devices, that gather, process, search, store, and/or provide information in a manner similar to that described herein. SCP 120 may communicate with user device 110 in order to obtain information associated with user device 110. SCP 120 may send the information, associated with user device 110, to SCGW 140 that permits the user device 110 to be authenticated. SCP 120 may temporarily store information associated with a communication session with user device 110 that enables the communication session with user device 110 to be maintained for a period of time and/or renewed within a period of time (e.g., less than a threshold) after the session expires. SCP server 120 may obtain context information associated with user device 110. SCP server 120 may send the context information to SCGW 140 that permits a level of trust, associated with user device 110, to be determined. The context information may include information associated with a type of user device 110, geographic location information, and/or network access information (e.g., an access point name (APN), a packet data network (PDN) identifier, a gateway device identifier, etc.).

SCP 120 may include one or more application programming interfaces (APIs) that enable SCP 120 to communicate with SCGW 140. The one or more APIs may enable SCP 120 to act as an "island of containment" that provides a logical barrier between user device 110 and SCGW 140 in the event that a security event associated with user device 110 is detected. For example, if user device 110 transmits a virus to SCP 120, SCP 120 may detect the virus and may determine that a potential security event has occurred. SCP 120 may use one or more of the APIs to perform a containment operation that prevents the virus from being transmitted to SCGW 140 and/or service provider network 160. SCP 120 may notify, via one of the APIs, SCGW 140 that a security event has been detected.

SCP 120 may receive information and or services from SCGW 140 as a result of a user device 110 being successfully authenticated and may transmit the information and/or services to user device 110. SCP 120 may cause a communication session not to be initiated with user device 110 based on a notification, received from SCGW 140, indicating that user device 110 was not authenticated. SCP 120 may cause a communication session to be terminated and/or a level of access to a network to be downgraded based on a notification that a level of trust, associated with user device 110, has decreased to a level that is less than a threshold. SCP 120 may cause a communication session to be extended and/or a level of access to the network to be upgraded based on a notification that the level of trust, associated with user device 110, has increased to a level that is greater than the threshold.

Application server 130 may include one or more server devices, or other types of computation or communication devices, that gather, process, search, store, and/or provide information and/or services in a manner similar to that described herein. In one example implementation, application server 130 (e.g., application server 130-N) may be associated with a network (e.g., network 170) that is not associated with SCGW 140. For example, application server 130 may, in response to a request, provide one or more services, to user device 110 and/or SCP 120. In one example, application server 130 may communicate with service provider network 160 (e.g., via SCGW 140) to obtain information associated with a level of trust associated with user device 110 and may determine whether to provide the one or more services to user device 110 based on the information associated with the level of trust. In another example, application server 130 may communicate with service provider network 160 to obtain information associated with another user device 110 (e.g., address book information, calendar information, geographic location information, presence information, etc.), that is associated with service provider network 160, and may use the information associated with the other user device 110 to provide the one or more services.

In another example implementation, application server 130 (e.g., application server 130-1) may be associated with a network (e.g., service provider network 160) that is associated with SCGW 140. For example, application server 130 may communicate with another user device 110, associated with service provider network 160, to obtain information from and/or send information to the other user device 110. Application server 130 may, for example and in response to a request, provide one or more services, to user device 110 and/or SCP 120 based on communications with the other user device 110.

SCGW 140 may include one or more server devices, or other types of computation or communication devices, that gather, process, search, store, and/or provide information and/or services in a manner similar to that described herein. In an example implementation, SCGW 140 may be an access point via which devices, associated with network 170, communicate with and/or receive services from service provider network 160. In another example implementation, SCGW 140 may store software and/or logic associated with a trust application that permits SCGW 140 to obtain context information associated with user device 110. SCGW 140 may obtain the context information from SCP 120 (e.g., based on communications with user device 110), from an identity management database stored in a memory associated with SCGW 140, from administration server 150, and/or by interrogating user device 110. When interrogating user device 110, for example, the trust application may send a query to user device 110 to obtain the context information, such as geographic location information, network access information (e.g., an APN, a PDN, a gateway identifier, port information, information associated with a user of user device 110, information associated with user device 110 capabilities and/or configuration, etc.).

The trust application may use the context information to identify a level of trust associated with user device 110. The trust application may, for example, assign a trust value to the context information based on a quantity of context information, associated with user device 110, that was obtained and/or based on a content associated with the context information. For example, the trust application may assign a trust value that corresponds to a high level of trust when a quantity of context information is greater than a threshold. In another example, the trust application may assign a trust value that corresponds to a high level of trust when a quantity of adverse information, associated with user device 110, is less than another threshold. Adverse information may include information that indicates that user device 110 may not be trustworthy (e.g., when an account associated with user device has been suspended, user information cannot be verified, etc.).

Based on a level of trust identified for user device 110, the trust application may grant a level of access, to service provider network 160 and/or information associated with another user device 110, that corresponds to the identified level of trust. For example, the trust application may generate a token that is to be used by user device 110 to access service provider network and/or the information associated with the other user device 110. The token may identify a level of access, a time period for which the access is granted, terms of renewing the token (e.g., within a renewal period of time after the time period expires, etc.), etc. Trust application may cause SCGW 140 to send the token to user device 110, via SCP 120, to be used to access service provider network 160 and/or the information associated with the other user device 110.

The trust application may detect a potential security event, associated with user device 110, when a level of trust is below a minimum threshold. Based on the detection of the potential security event, the trust application may deny access to user device 110. Additionally, or alternatively, the trust application may perform a containment operation that establishes a logical barrier to information flow, associated with user device 110, to and/or from service provider network 160. The trust application may perform the containment operation by sending a containment notification to SCP 120 indicating that the potential security event, associated with user device 110, has been detected.

For example, the containment notification may include an instruction to deny access to user device 110, terminate a communication session associated with user device 110, invalidate a token issued to user device 110, etc. In another example, the containment notification may instruct SCP server 120 to purge, from a memory associated with SCP server 120, information associated with user device 110. In yet another example, the containment notification may instruct SCP server 120 to purge a portion or all of the information stored in the memory to ensure that any nefarious information (e.g., malicious software, viruses, unauthorized and/or unknown applications, spyware, and/or other forms of malware) that may exist within the memory are erased, discarded, nullified, rendered inoperable, and/or or destroyed. The trust application may retrieve, from a memory associated with SCGW 140, an image of contents (e.g., data, applications, etc.), stored on SCP 120, that corresponds to a baseline state and/or a state that existed prior to a point in time that communications with user device 110 were initiated.

Administration server 150 may include one or more server devices, or other types of computation or communication devices, that gather, process, search, store, and/or provide information in a manner similar to that described herein. In an example implementation, administration server 150 may act as a home subscriber server (HSS) device and/or authorization, authentication, and accounting (AAA) server. In another example, administration server 150 may be an identity management server. When performing functions associated with the HSS device, administration server 150 may retrieve, from a memory associated with administration server 150, context information associated with user device 110, such as subscriber account information (e.g., whether the account is in good standing, is suspended, is delinquent, etc.), geographic location information, etc. Administration server 150 may send the context information to SCGW 140 to permit a level of trust, associated with user device 110, to be determined.

When performing functions associated with the AAA server, administration server 150 may perform an authentication and/or authorization operation on user device 110. For example, administration server 150 may receive a request, from SCGW 140, to perform the authentication and/or authorization operation on user device 110. Administration server 150 may perform the authorization and/or authentication operation based on information, associated with user device received in the request, the context information retrieved from the memory, and/or other information obtained from another server device. In another example, administration server 150 may retrieve policy information associated with service provider network 160 and/or permission information associated with a user of another user device 110. Administration server 150 may, for example, retrieve policy information, associated with service provider network 160, from a memory (e.g., a memory associated with administration server 150) to determine whether the policy information permits user device 110 to access service provider network 160. Additionally, or alternatively, administration server 150 may determine whether and/or under what conditions a user, of another user device 110 from which information is to be obtained, authorizes the release of information to user device 110.

Service provider network 160 may include one or more wired and/or wireless networks via which application registration, verification, and/or authorization services are provided. For example, service provider network 160 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally, or alternatively, service provider network 160 may include a wide area network (WAN), a metropolitan area network (MAN), an ad hoc network, an intranet, a fiber optic-based network (e.g., a fiber optic service (FiOS) network), and/or a combination of these or other types of networks.

Network 170 may include one or more wired and/or wireless networks. For example, network 170 may include a cellular network, the PLMN, a 2G network, a 3G network, a 4G network (e.g., an LTE network), a 5G network, and/or another network. Additionally, or alternatively, network 170 may include a WAN, a MAN, a telephone network (e.g., the Public Switched Telephone Network (PSTN)), an ad hoc network, an intranet, the Internet, a fiber optic-based network (e.g., a FiOS network), and/or a combination of these or other types of networks.

Figure 2:
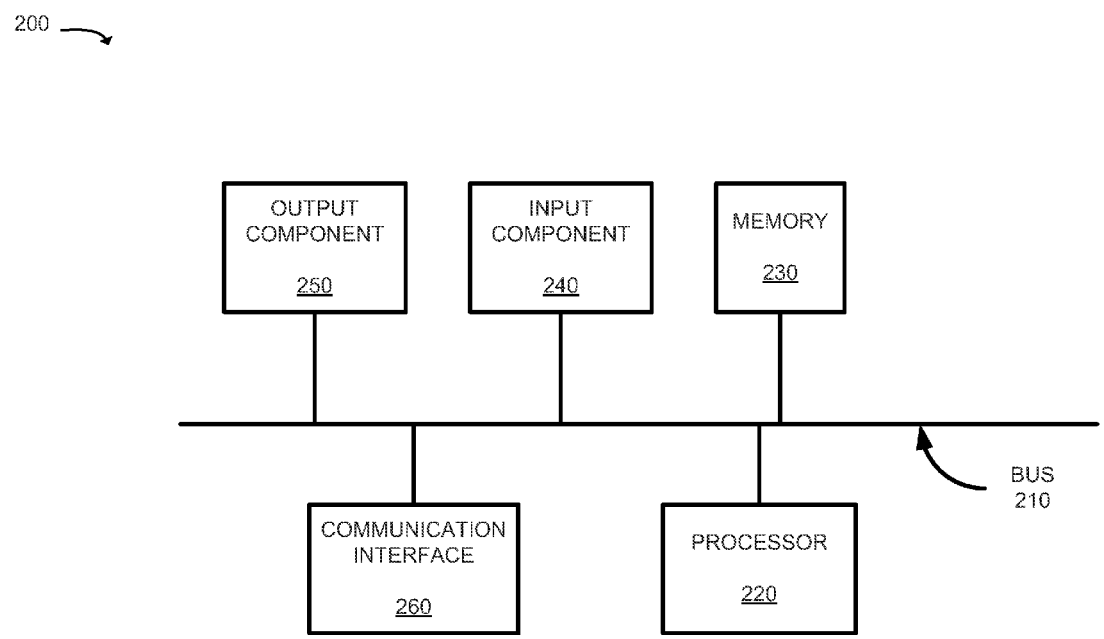
FIG. 2 is a diagram of example components of one or more of the devices of FIG. 2.

FIG. 2 is a diagram of example components of a device 200. Device 200 may correspond to user device 110, SCP 120, application server 130, SCGW 140, and/or administration server 150. Alternatively, each of user device 110, SCP 120, application server 130, SCGW 140, and/or administration server 150 may include multiple devices 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, a microphone, a camera, a fingerprint reader, etc. Output component 250 may include a mechanism that outputs information to the user, such as a display, a speaker, one or more light emitting diodes (LEDs), a haptics-based device, etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as service provider network 160 and/or network 170.

As will be described in detail below, device 200 may perform certain operations relating to end point context and/or trust level determinations. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
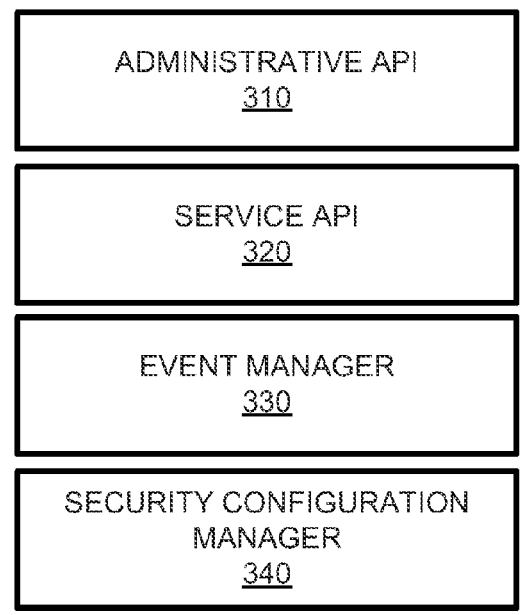
FIG. 3 is a diagram of example functional components associated with one or more devices of FIG. 2.

FIG. 3 is a diagram of example functional components 300 associated with SCP 120 and/or SCGW 140. As illustrated, functional components 300 may include an administrative application program interface (API) 310, a service API 320, an event manager 330, and/or a security configuration manager 340. The number of functional components, illustrated in FIG. 3, is provided for explanatory purposes only. In practice, there may be additional functional components, fewer functional components, different functional components, or differently arranged functional components than illustrated in FIG. 3. Also, the functional components in FIG. 3 may be implemented using one or more of the components of device 200 (FIG. 2), such as processor 220.

Administrative API 310 may process information that is to be used to determine a context associated with user device 110. For example, administrative API 310 may process information obtained from a variety of sources (e.g., user device 110, SCP 120, application server 130, administrative server 150, etc.) and/or associated with different protocols and/or formats in order to convert the information into a format and/or protocol that can be received and/or processed by the trust application. The information may include information associated with user device 110 (e.g., a device identifier, a device address, etc.), information associated with a user of user device 110 (e.g., a username, password, PIN, biometrics, etc.), information associated with an application hosted by user device 110 (e.g., an application identifier, a license file, an application signature, an application certification, etc.), context information associated with user device 110 (e.g., geographic location information, device capabilities, a carrier identifier, account information associated with user device 110, etc.). Additionally, or alternatively, administrative API 310 may create a logical barrier that prevents the information from flowing from user device 110 to service provider network 160 via SCGW 140 without being processed via administrative API 310. In this example, administrative API 310 may not permit information associated with user device 110, information associated with the user, information associated with the application, and/or context information associated with user device 110 to be sent to SCGW 140 without being processed via administrative API 310. Not permitting the information to flow to SCGW 140 without being processed by administrative API 310 may create a barrier to nefarious information from being inserted into service provider network 160.

Service API 320 may enable a service to be provided to SCP 120 in a manner that can be received and/or processed by user device 110 (e.g., when SCP 120 forwards information and/or data, associated with the service, to user device 110). For example, service API 320 may convert the information and/or data into a format and/or protocol that can be received and/or processed by user device 110 based on context information associated with a type and/or configuration of user device 110. Additionally, or alternatively, service API 320 may, in a manner similar to that described above (e.g., with respect to administrative API 310) create a logical barrier that prevents information (e.g., including nefarious information) and/or data (e.g., associated with the service) from flowing from user device 110 to service provider network 160, via SCGW 140, without being processed by service API 320.

Event manager 330 may detect nefarious information contained in information and/or data being received from and/or sent to user device 110. Event manager 330 may, based on the detection of the nefarious information, determine that a potential security event exists and may perform a quarantine operation to isolate, purge and/or render harmless the nefarious information. Event manager 330 may, as a result of the security event, perform a containment operation that may cause all or a portion of information, stored in a memory associated with SCP 120, to be flushed (e.g., purged, erased, discarded, etc.), overwritten, and/or rendered harmless. The containment operation may avoid and/or mitigate a risk associated with the nefarious information adversely affecting service provider network 160 and/or data therein.

Security configuration manager 340 may restore a configuration associated with SCP server 120 that enables SCP server 120 to perform operations as intended prior to the security event. In one example, security configuration manager 340 may store an image and/or copy of the contents of SCP server 120 and may use the image and/or copy to restore data lost due to the nefarious information and/or the containment operation. In another example, security configuration manager 340 may use the image and/or copy to reinstall an operating system, applications, information and/or data to a pre-security event state. In yet another example, security configuration manager 340 may reestablish one or more virtual environments, by recreating, configuring and/or starting up one or more virtual machines associated with SCP server 120. In still another example, security configuration manager 340 may communicate with another server device (e.g., administrative server 150) to obtain a copy and/or image of the contents of SCP server 120 and/or SCGW 140 in order to perform the restore and/or reinstall operation.

FIG. 4 is a diagram of an example end point device context data structure 400 (hereinafter referred to as "context data structure 400") according to an implementation described herein. As illustrated in FIG. 4, context data structure 400 may include a collection of fields, such as a device information (info) field 402, an application identifier (ID) field 404, a user information (info) field 406, a carrier identifier (ID) field 408, a device identifier (ID) source field 410, a servicing identifier (ID) field 412, a geographic location information (info) field 414, an account state field 416, a network access point field 418, and a policy information (info) field 420. Context data structure 400, of FIG. 4, includes fields 402-420 for explanatory purposes. In practice, context data structure 400, of FIG. 4, may include additional fields, fewer fields, different fields, and/or differently arranged fields than are described with respect to context data structure 400 of FIG. 4.

Device info field 402 may store information associated with a particular user device 110 with which a communication session is to be established. For example, SCGW 140 may receive information associated with the particular user device 110 and the trust application may store the information associated with the particular user device 110 (e.g., a device identifier, an address, etc.) in device info field 402. Application ID field 404 may store information associated with an application hosted by the particular user device 110. The information associated with the application may include an application identifier, an application file, an application signature, a vendor identifier, an application certificate, etc. User info field 406 may store information associated with a user of user device 110. The information associated with the user may include a username, password, PIN, biometrics information, etc.

Carrier ID field 408 may store information associated with a carrier and/or service provider (e.g., Verizon®, Sprint®, etc.) with which the user of the particular user device 110 has an account that enables the particular user device 110 to communicate with network 170 and/or service provider network 160. Device source ID field 410 may store information associated with a source from which the information that corresponds to the particular user device 110 was assigned. For example, the particular user device 110 may have an MDN that was issued by a particular carrier associated with service provider network 160. In another example, the particular user device 110 may have an MDN that was issued, by another carrier, from a block of wholesale MDNs sold to the other carrier by the carrier associated with service provider network 160. In yet another example, the particular user device 110 may have an MDN that was issued by a further carrier.

Servicing ID field 412 may include information associated with an IP multimedia subsystem (IMS), etc. that is serving the particular user device 110. The IMS may manage authentication, session initiation, account information, profile information, etc. associated with the particular user device 110. For example, the information associated with the IMS may include information associated with devices that are included within the IMS (e.g., an HSS device, an AAA server, a call session control function (CSCF) server, etc.) that services the particular user device 110 and/or enables the particular user device 110 to communicate with network 170, SCP 120, service provider network 160, etc.

Location info field 414 may store geographic location information associated with the particular user device 110. For example, the trust application may obtain geographic location information associated with the particular user device 110 and may store the geographic location information in location info field 414. The geographic location information may be obtained as a result of a query sent to the particular user device 110, from information obtained from an access request received from the particular user device 110 and/or from information retrieved from administration server 150. Account state field 416 may store information corresponding to a state of an account with a carrier associated with the particular user device 110. For example, the trust application may store information associated with whether the account is in good standing, is delinquent, is suspended, etc.

Network access point field 418 may store information associated with a network connection with the particular user device 110. For example, the trust application may identify network connection information associated with a manner in which the device application, hosted by the particular user device 110, communicates with service provider network 160 during an authentication and/or communication session. The network connection information may, for example, include information identifying a particular gateway server (e.g., a service gateway server, a packet data network (PDN) gateway server, etc.), a port on the particular gateway server via which the device application communicates, an access point name (APN), and/or other network connection information.

Policy information field 420 may store policy information, associated with whether a policy authorizes access to information associated with service provider network 160. Policy information field 420 may also, or alternatively, store privacy settings specified by a user of another user device 110 associated with service provider network 160, that indicates whether and/or the manner in which information, associated with the other user device 110, is permitted to be accessed by the particular user device 110.

SCGW 140 may, for example, receive information, associated with user device 110, from SCP 120 in response to a request to access service provider network 160 and the trust application may store the information associated with user device 110 in context data structure 400. In another example, the trust application may obtain information associated with user device 110 and/or context information associated with user device 110 based on a query sent to user device 110. In yet another example, the trust application may receive context information associated with user device 110 based on a request for context information sent to administrative server 150 and/or another server (e.g., an identity management server, etc).

In one example, the trust application may store an identifier (e.g., MDN) associated with user device 110, an application identifier (e.g., APP1) associated with an application (e.g., hosted by user device 110) via which user device 110 seeks access to service provider network 160, information associated with a user (e.g., user 1) of user device 110, and/or geographic location information (e.g., location A) associated with user device 110 (e.g., as shown by ellipse 422). The trust application may communicate with administrative server 150 to identify a carrier with which the device identifier is associated (e.g., carrier 1), a source that issued the device identifier (e.g., carrier1) and/or an account state associated with user device 110 (e.g., premier standing) (e.g., as shown by ellipse 422). The trust application may also communicate with administrative server 150 to identify whether, and/or the manner in which access to information, associated with service provider network 160, is authorized based on policy information (e.g., authorized) associated with service provider network 160 and/or privacy settings (e.g., permitted) specified by a user of another user device 110, associated with service provider network 160, from which information is to be accessed by user device 110 (e.g., as shown by ellipse 422).

When communicating with SCP server 120 and/or with user device 110, SCGW 140 may determine via which network access point information and/or services (e.g., APN1/PDN 1), associated with user device 110, is being received and/or sent and the trust application may store information associated with the network access point in context data structure 400 (e.g., as shown by ellipse 422). SCGW 140 may determine which system is servicing user device 110 (IMS1) and may store information associated with the service in context data structure 400 (e.g., as shown as ellipse 422). Trust application may store information, associated with one or more other user devices 110 (e.g., as shown by ellipses 424-428), in context data structure 400 based on communication sessions initiated and/or created with the other user devices 110.

Figure 5:
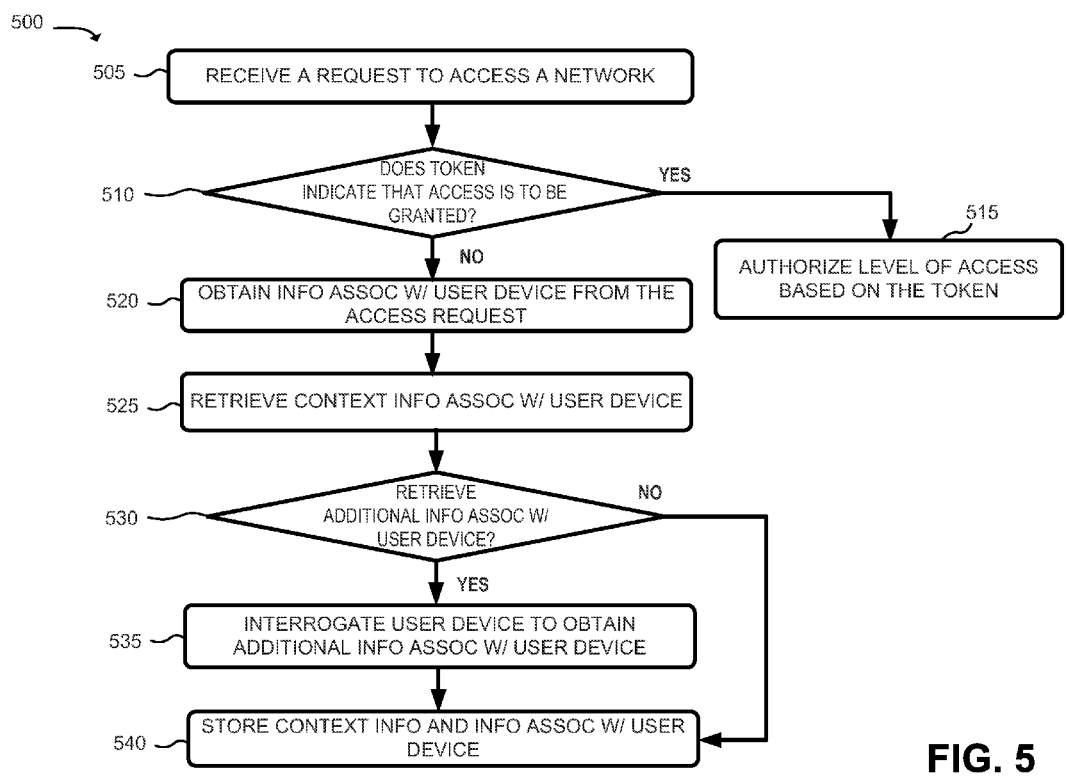
FIG. 5 is a flow chart of an example process for determining a context state associated with a user device of FIG. 1.

FIG. 5 is a flowchart of an example process 500 for determining a context state associated with user device 110. In one implementation, process 500 may be performed by SCGW 140. In another implementation, some or all of process 500 may be performed by a device or collection of devices separate from, or in combination with, SCGW 140.

As shown in FIG. 5, process 500 may include receiving a request to access a network (block 505). For example, SCP 120 may receive a request to access service provider network 160 and may forward the request to SCGW 140. SCGW 140 may receive the request and a trust application, hosted by SCGW 140, may determine whether an access token was received with the access request. The request may be received and/or processed by SCGW 140 using one or more APIs (e.g., administrative API 310 of FIG. 3). The access token may include information associated with user device 110, a period of time associated with a communication session associated with user device 110, and/or conditions under which user device 110 is authorized to access service provider network 160. In another example implementation, the access request may not include the access token. For example, SCGW 140 may receive the access request and may obtain, from the request, the information associated with user device 110, the period of time associated with the communication session, and/or the conditions under which user device 110 is authorized to access service provider network 160.

As also shown in FIG. 5, if a token indicates that access is to be granted (block 510—YES), then process 500 may include authorizing a level of access to the network based on the token (block 515). For example, the trust application may determine that the communication session, associated with user device 110, has not expired when a time that the access request was received is within the period of time associated with the communication session. Alternatively, or additionally, the trust application may determine that a condition, under which user device 110 can access service provider network 160, has been satisfied. In one example, the condition may identify another period of time during which user device 110 is permitted to access service provider network 160 and the trust application may determine that a current time is within the other period of time. In yet another example, the token may include a value associated with a level of trust associated with user device 110. The level of trust may be used by the trust application to determine a level of access with which to authorize user device 110 to access service provider network 160. For example, access may be granted for some network services (e.g., messages sent via a short message service (SMS)), while denying access for other services (e.g., a terminal location service, an address book service, etc.). Based on the determination that the communication session has not expired, the determination that the condition is satisfied, and/or the value associated with the level of trust, the trust application may send a notification, to SCP server 120, that authorizes user device 110 to access service provider network 160.

As further shown in FIG. 5, if a token indicates that access is not to be granted (block 510—NO), then process 500 may include obtaining, from the request, information associated with user device 110 (block 520) and retrieving context information associated with user device 110 (block 525). For example, the trust application may determine that the communication session associated with user device 110 has expired when the time that the access request was received is not within the period of time associated with the communication session. Alternatively, or additionally, the trust application may determine that the condition, under which user device 110 can access service provider network 160, has not been satisfied. In one example, the condition may identify another period of time during which user device 110 is permitted to access service provider network 160 and the trust application may determine that the current time is not within the other period of time.

Based on the determination that the communication session has expired and/or that the condition has not been satisfied, the trust application may obtain information associated with user device 110 from the token and/or the access request received from SCP 120. The information, associated with user device 110, may include a device identifier (e.g., MDN, LDN, SIM URI, IMSI, etc.), a network address (e.g., an IP address, a MAC address, etc.) and/or information associated with a user of user device 110 (e.g., a username, password, PIN, etc.).

The trust application may also obtain context information associated with user device 110 from the token and/or access request. For example, the trust application may obtain geographic location information associated with user device 110, an application identifier (e.g., application ID, application signature, etc.), or the like. Alternatively, or additionally, the trust application may send a request for context information, associated with user device 110 to administrative server 150. Administrative server 150 may receive the request and, in one example, may authenticate user device 110. Administrative server 150 may authenticate user device 110 by determining whether information associated with user device 110, received in the request, matches information associated with user device 110 stored in a memory associated with administrative server 150. If administrative server 150 authenticates user device 110 (e.g., if the received information matches the stored information), then administrative server 150 may retrieve, from the memory, context information associated with user device 110. If administrative server 150 does not authenticate user device 110 (e.g., if the received information does not match the stored information), then administrative server 150 may not send the context information to SCGW 140. In another example implementation, the context information, associated with user device 110, may be stored and/or maintained, by the trust application, within a memory associated with SCGW 140.

The context information may include information associated with a carrier that corresponds to user device 110, information associated with a source, such as a carrier (e.g., Verizon®, AT&T®, etc.) from which a device identifier (e.g., an MDN, an LDN, etc.) was issued, information associated with a state of an account associated with user device 110, and/or policy information associated with service provider network 160. SCGW 140 may also, or alternatively, obtain information associated with a network access point through which user device 110 is communicating and/or information associated with a system that services user device 110 (e.g., an IMS, etc.).

As still further shown in FIG. 5, if additional information, associated with user device 110, is to be retrieved (block 530—YES), then process 500 may include interrogating user device 110 to obtain additional information associated with user device 110 (block 535). For example, the trust application may determine that certain information (e.g., geographic location information, information associated with the user, information associated with capabilities of user device 110, and/or information associated with a type and/or model of user device 110, etc.) could not be obtained from the access request and/or administrative server 150. Based on the determination that the certain information could not be obtained, the trust application may cause SCGW 140 to interrogate user device 110 by sending a query to user device 110 to obtain the certain information.

As also shown in FIG. 5, if additional information, associated with user device 110, is not to be retrieved (block 530—NO), or after interrogating user device 110 and/or administrative server 150 to obtain additional information associated with user device 110 (block 535), process 500 may include storing the context information and/or the information associated with user device 110 (block 540). For example, the trust application may store the information associated with user device 110 and/or the context information, associated with user device 110, in a data structure (e.g., context data structure 400 of FIG. 4) which may be stored in a memory associated with SCGW 140. The trust application may use the information associated with user device 110 and/or the context information associated with user device 110 to determine a level of trust to assign to user device 110 as described below in FIGS. 6 and 7.

FIG. 6 is a diagram of an example trust level data structure 600 (hereinafter referred to as trust data structure 600) according to an implementation described herein. Trust data structure 600 may be used by the trust application, hosted by SCGW 140 to determine a level of trust to assign to user device 110. As illustrated in FIG. 6, trust data structure 600 may include all or a portion of the fields (e.g., fields 402-420) included in context data structure 400 of FIG. 4. Trust data structure 600 may also include a group of score fields 610-1, . . . , 610-P (where P≥1) (hereinafter referred to as "score field 610"), and a group of level of trust fields 620-1, . . . , 620-Q (where Q≥1) (hereinafter referred to as "level of trust field 620"). Trust data structure 600, of FIG. 6, includes fields 402-420, 610, and 620 for explanatory purposes. In practice, trust data structure 600, of FIG. 6, may include additional fields, fewer fields, different fields, and/or differently arranged fields than are described with respect to trust data structure 600 of FIG. 6.

Score field 610 may store values corresponding to a relative measure of trustworthiness (hereinafter referred to as trust values), associated with a particular user device 110, based on information associated with user device 110 and/or context information associated with user device 110 stored in trust data structure 600. For example, score field 610 may store a trust value for each entry that corresponds to a respective field, within trust data structure 600, associated with the particular user device 110.

Level of trust field 620 may store a value that represents a sum of the trust values, stored in score field 610, associated with user device 110. The value stored in level of trust field 620 may correspond to a measure of trustworthiness (e.g., a level of trust) associated with the particular user device 110 that the trust application may use to determine whether to permit the particular user device 110 to access services provided by provider network 160. Additionally, or alternatively, the trust application may use the value, stored in level of trust field 620, to determine a level of access, to service provider network 160, that is authorized for the particular user device 110, such as no access (e.g., no access to any services), limited access (e.g., access to particular services and no access to other services), full access (e.g., access to all services), etc. The trust application may also, or alternatively, determine whether a potential security event has been detected (e.g., when a level of trust is below a threshold).

The trust application may assign a trust value for a particular entry based on whether or not the entry stores information. For example, user info field 406 may store information associated with a user of the particular user device 110 (e.g., user1) and the trust application may store a particular trust value (e.g., 1) in score field 610-1 that corresponds to user info field 406 based on the determination that user info field 406 stores the information associated with the user. In another example, user info field 406 may not store information associated with the user and the trust application may store a trust value that is less than the particular trust value (e.g., 0) in score field 610-P that corresponds to user info field 406 based on the determination that user info field 406 does not store the information associated with the user.

In another example, the trust application may assign a trust value for the particular entry based on whether the information, stored in the entry, is likely to increase a quantity of security risk, decrease a quantity of security risk, or neither increase nor decrease a quantity of security risk (e.g., less than the threshold and greater than the other threshold) associated with user device 110. For example, account state field 416 may store information associated with a state of an account (e.g., premier standing) that is likely to decrease a quantity of security risk associated with the particular user device 110. Based on the likelihood that state of the account is likely to decrease the quantity of security risk, the trust application may store a high trust value (e.g., 1). In another example, account state field 416 may store information associated with the state of an account (e.g., good standing) that is not likely to increase or decrease a quantity of security risk associated with the particular user device 110. Based on the likelihood that the state of the account is not likely to increase or decrease a quantity of security risk, the trust application may store a neutral trust value (e.g., 0) that is less than the high trust value and greater than a low trust value. In yet another example, account state field 416 may store information associated with a state of an account (e.g., suspended) that is likely to increase a quantity of security risk associated with the particular user device 110. Based on the likelihood that state of the account is likely to increase the quantity of security risk, the trust application may store a low trust value (e.g., −1) that is less than the neutral trust value.

Based on the trust values in score field 610, that correspond to each of the entries within trust data structure 600, the trust application may generate a sum of the trust values and may store the sum in level of trust field 620. For example, the trust application may generate a sum of the trust values 610-1, associated with the particular user device 110, and may store the sum (e.g., 10) in level of trust field 620-1 (e.g., as shown by ellipse 622). The trust application may, in another example, generate another sum based on other trust values (e.g., score field 610-2), associated with another user device 110, and may store the other sum (e.g., 7) in level of trust field 620-2 (e.g., as shown by ellipse 624). The trust application may generate a further sum (e.g., 3) associated with a further user device 110 and may store the further sum in level of trust field 620-Q (e.g., as shown by ellipse 626).

Based on the values stored in the level of trust fields 620, the trust application may, in one example, determine whether to authorize user device 110 to access service provider network 160 based on whether the level of trust, associated with user device 110, is greater than a threshold. In another example, the trust application may deny access to user device 110 when the level of trust, associated with user device 110, is less than the threshold and may detect a potential security event if the level of trust is below a minimum threshold. If a potential security event is detected, the trust application may determine that user device 110 poses a substantial and/or immediate security threat to the integrity of the service provider network 160, such as when an imposter user device 110 is identified, when a potential virus is detected, when a user device associated with a suspended account is being used, etc. Based on the detection of the potential security event, the trust application may perform an operation to contain the security event in a manner described above (e.g., with respect to FIGS. 2 and 3). In still another example, the trust application may grant limited access if the level of trust is greater than the threshold, but less than another threshold. The trust application may grant higher levels of access that correspond to higher levels of trust.

Figure 7:
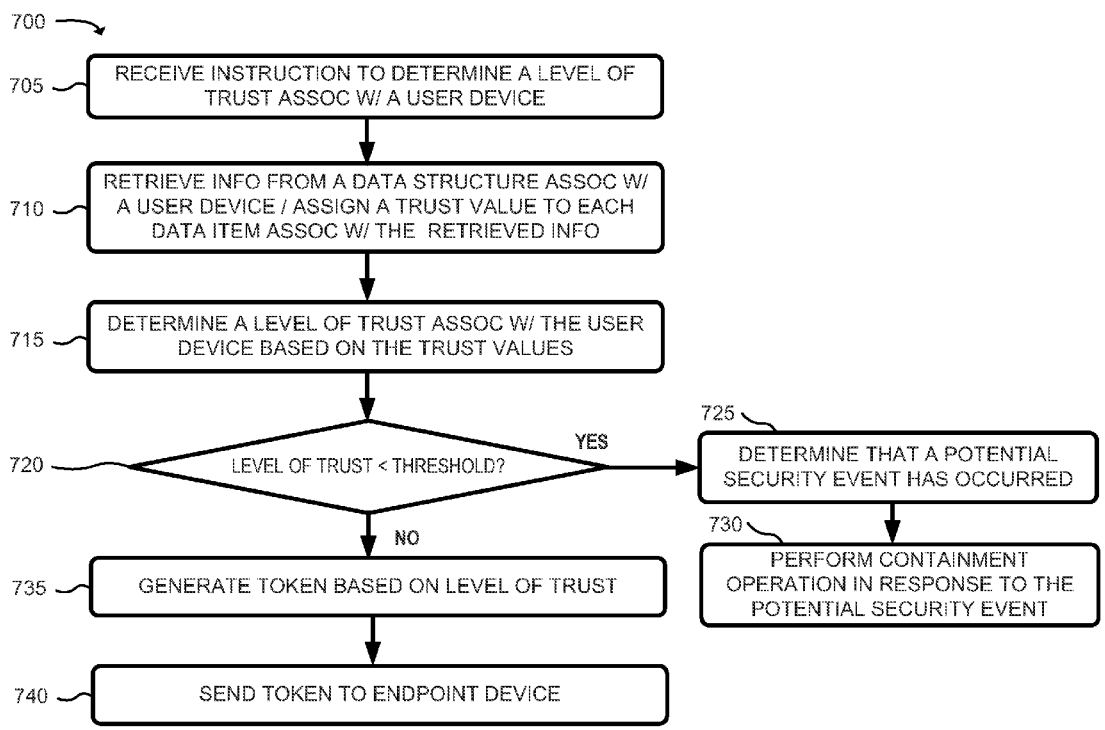
FIG. 7 is a flow chart of an example process for determining a trust level associated with a user device.

FIG. 7 is a flowchart of an example process for determining a trust level associated with user device 110. In one implementation, process 700 may be performed by SCGW 140. In another implementation, some or all of process 700 may be performed by a device or collection of devices separate from, or in combination with, SCGW 140.

As shown in FIG. 7, process 700 may include receiving an instruction to determine a level of trust associated with user device 110 (block 705), retrieving information from a data structure associated with user device 110, and/or assigning a trust value to each data item associated with the retrieved information (block 710). For example, SCGW 140 may determine a level of trust associated with user device 110 in response to an access request, associated with user device 110, that was processed in a manner similar to that described above (e.g., with respect to FIG. 5). In another example, SCGW 140 may determine the level of trust in response to receipt of an update request, from SCP 120, to update a level of trust and/or an access token associated with user device 110. SCP 120 may send the update request based on a determination, by SCP 120, that an authorization state and/or access token, associated with user device 110, has or is about to expire and/or that conditions under which the authorization and/or token were granted are no longer valid. The trust application may, in response to the access request and/or update request, retrieve information from a data structure (e.g., context data structure 400 of FIG. 4), stored in a memory associated with SCGW 140, in response to the request to access service provider network 160, received from user device 110 via SCP 120.

The trust application may use information, obtained from the context data structure, to determine whether and/or a level in which user device 110 is authorized to access service provider network 160 in response to the access request. The trust application may use the information obtained from the context data structure to determine a level of trust associated with user device 110. For example, the trust application may, in a manner similar to that described above (e.g., with respect to FIG. 5), assign a trust value to each element of the information (e.g., to each entry, associated with user device 110, stored in the context data structure). In one example implementation, the trust application may store the information obtained from the context data structure and/or the assigned trust values in a trust data structure (e.g., trust data structure 600 of FIG. 6).

As also shown in FIG. 7, process 700 may include determining a level of trust associated with user device 110 based on the trust values (block 715). For example, the trust application may determine a level of trust associated with user device 110 based on the trust values associated with the information obtained from the context data structure. In one example, the trust application may determine a level of trust associated with user device 110 based on a sum of the assigned trust values. The trust application may, for example, use the level of trust to determine whether to authorize user device 110 to access service provider network 160. In another example, the trust application may use the level of trust to determine a level of access, associated with user device 110, to service provider network 160, such as no access (e.g., no access to any services), limited access (e.g., access to particular services and no access to other services), full access (e.g., access to all services), etc. In yet another example, the trust application may determine whether user device 110 poses a substantial and/or immediate security threat to the integrity of service provider network 160 by comparing the level of trust to a threshold.

As further shown in FIG. 7, if a level of trust is less than a threshold (block 720-YES), then process 700 may include determining that a potential security event has occurred (block 725) and performing a containment operation in response to the potential security event (block 730). For example, the trust application may detect a potential security event and/or may determine that user device 110 poses a substantial and/or immediate security threat to the integrity of service provider network 160 based on a determination that the level of trust is less than the threshold.

For example, the level of trust may be less than the threshold when a quantity of entries (e.g., within the trust data structure), that store data items associated with information associated with user device 110 or context information associated with user device 110, are less than an entry threshold (e.g., when all or most entries are empty relative to the entry threshold). The trust application may, in this example, assign a trust value to an empty entry that is less than a trust value that corresponds to an entry that stores a data item.

In another example, the level of trust may be less than the threshold when a quantity of entries (e.g., within the trust data structure) store information that is likely to increase a quantity of security risk associated with user device 110. The trust application may, for example, assign particular trust values to data items that correspond to information associated with the user device and/or context information associated with the user device that are likely to increase a quantity of security risk associated with user device 110 (e.g., a data item identifying an account as delinquent or in poor standing). In this example, the particular trust values may be less than trust values that correspond to data items that are likely to decrease the quantity of security risk associated with user device 110 (e.g., a data item indicating an account in premier or good standing) or data items that will neither decrease nor increase the quantity of risk associated with user device 110 (e.g., a blank entry within the data structure).

Based on the determination that the level of trust, associated with user device 110, is less than the threshold, the trust application may initiate a containment operation to ensure that user device 110 does not access service provider network 160 and/or that information, potentially associated with user device 110 (e.g., which may include nefarious information), does not flow into service provider network 160. For example, the trust application may cause certain APIs (e.g., administrative API 310, service API 320, etc., of FIG. 3), within SCGW 140, not to receive and/or process traffic (e.g., associated with user device 110 and/or any traffic) sent from SCP 120. In another example, the trust application may send a containment notification to SCP 120 indicating that the containment operation is to be performed. The containment notification may, in one example, instruct SCP 120 to flush (e.g., remove, erase, purge, overwrite, etc.) all information and/or data stored in a memory associated with SCP 120. In another example, the containment notification may instruct SCP 120 to flush a portion of the information and/or data, associated with user device 110, stored in the memory.

In another example implementation, the trust application may initiate the containment operation in response to a security event notification, from SCP 120, indicating that a potential security event has been detected. In this example, SCP 120 may determine that a potential security event has occurred when nefarious information is received from user device 110, a change and/or degradation in performance (e.g., that is greater than a performance threshold) is detected, and/or a scan of the memory results in an identification of a virus and/or other nefarious information. SCGW 140 may receive the security event notification and may, in response, send a containment notification instructing SCP 120 to perform a containment operation in a manner similar to that described above.

As yet further shown in FIG. 7, if a level of trust is not less than a threshold (block 720—NO), then process 700 may include generating a token based on the level of trust (block 735) and sending the token to the user device 110 (block 740). For example, the trust application may determine that a potential security event has not occurred based on a determination that the level of trust is not less than the threshold. For example, the level of trust may not be less than the threshold when a quantity of entries (e.g., within the trust data structure), that store data items associated with information associated with user device 110 or context information associated with user device 110, are greater than an entry threshold (e.g., when none or only a few entries are empty relative to the entry threshold). The trust application may, in this example, assign a trust value, to a data item stored within an entry, that is greater than a trust value that corresponds to an entry that does not store a data item.

In another example, the level of trust may not be less than the threshold when a quantity of entries (e.g., within the trust data structure) store information that is likely to decrease a quantity of security risk associated with user device 110. The trust application may, for example, assign particular trust values to data items that correspond to information associated with the user device and/or context information associated with the user device that are likely to decrease a quantity of security risk associated with user device 110 (e.g., a data item identifying an account as premier and/or in good standing). In this example, the particular trust values may be greater than trust values that correspond to data items that are likely to increase the quantity of security risk associated with user device 110 (e.g., a data item indicating an account in poor standing or a delinquent account) or data items that will neither decrease nor increase the quantity of risk associated with user device 110 (e.g., a blank entry within the data structure).

Based on the determination that the level of trust, associated with user device 110, is not less than the threshold, the trust application may not initiate a containment operation and may determine whether to permit user device 110 to access service provider network 160. For example, if the level of trust associated with user device 110 is less than an access threshold, then the trust application may send a notification to SCP 120 and/or user device 110 indicating that access to service provider network 160 is not authorized. In another example, if the level of trust, associated with user device 110, is not less than the access threshold, then the trust application may authorize user device 110 to access service provider network 160.

Based on the determination that user device 110 is authorized to access service provider network 160, the trust application may determine an access level at which user device 110 is to be authorized to access service provider network 160 based on the level of trust. In one example, the trust application may determine that the level of trust is greater than a maximum access threshold and the trust application may generate a token that grants full access to service provider network 160. In another example, if the trust application determines that the level of trust is not greater than the maximum access threshold and is greater than a minimum access threshold, then the trust application may generate a token that grants medium access (e.g., less than full access) to service provider network 160. In yet another example, the trust application may determine that the level of trust is not greater than a minimum access threshold and the trust application may generate a token that grants minimum access (e.g., less than medium access or no access) to service provider network 160. It should be appreciated that the minimum, medium, and/or maximum levels of access are described for explanatory purposes. In other example implementations, there may be additional access levels, different access levels, fewer access levels, and/or differently arranged access levels than are described above.

The access token may be sent to SCP 120 and/or user device 110 that enables user device 110 to use the access token in order to access service provider network 160. The access token may, for example, identify a level of access (minimum, medium, maximum, etc.), a period of time during which the access is authorized, information on which access is authorized (e.g., information associated with user device 110 and/or context information associated with user device 110), whether and/or a manner in which the period of time may be extended, etc.

Systems and/or methods, described herein, may enable context information and/or information associated with user device 110 to be obtained in response to a request to access a service provider network received from user device 110. The systems and/or methods may enable a level of trust, associated with user device 110, to be determined based on the context information and/or information associated with user device 110. The systems and/or methods may use the level of trust to determine whether and/or at what level user device 110 is to be granted access to the service provider network. The systems and/or methods may use the level of trust to determine whether a potential security event, associated with the network, has occurred that may cause the trust application to perform a containment operation in order to avoid and/or minimize effects caused by the security event. The systems and/or methods may permit a server device to act as a proxy, for the service provider network, that enables the containment operation to be performed and/or level of trust to be determined and/or maintained with respect to user device 110.

The foregoing description provides illustration and description, but is not intended to be exhaustive or to limit the implementations to the precise form disclosed. Modifications and variations are possible in light of the above teachings or may be acquired from practice of the embodiments.

While series of blocks have been described with regard to FIGS. 5 and 7, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component or logic that performs one or more functions. A component or logic, as used herein, may include hardware, such as a processor, an application specific integrated circuit (ASIC), or a field-programmable gate array (FPGA), or a combination of hardware and software (e.g., a processor executing software).

It should be emphasized that the terms "comprises" and/or "comprising," when used in this specification, are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a server device, the method comprising:
   receiving, by the server device and from a proxy server, a request, by a user device, to access a network associated with the server device;
   obtaining, by the server device and in response to the request, information associated with the user device, including:
      obtaining, from the request, all or fewer than all of one or more identifiers associated with the user device,
      retrieving, from another server device, all or a portion of context information associated with the user device, and
      sending, to the user device, a query to obtain more of the one or more identifiers or the context information when a quantity of the one or more identifiers or the context information, obtained from the request or retrieved from the other server device, is less than a threshold;
   determining, by the server device, a level of trust associated with the user device based on the one or more identifiers and the context information, where the level of trust is a measure of security risk associated with each of the one or more identifiers and the context information;
   generating, by the server device, an access token based on the level of trust, where the access token identifies a level at which the user device is authorized to access the network; and
   sending, by the server device and to the user device via the proxy server, the access token, where the access token enables the proxy server to authorize the user device to access the network at the level identified by the access token.

2. The method of claim 1, further comprising:
   storing, within one or more entries of a plurality of entries associated with a data structure, a portion of the information associated with the user device obtained from the request or from the other server device;
   determining that one or more other entries, of the plurality of entries, do not store any of the information associated with the user device; and
   storing, within the one or more other entries, the other portion of the one or more identifiers or the context information.

3. The method of claim 1, where determining the level of trust associated with the user device further includes:
   storing, within a plurality of entries associated with a data structure, a plurality of data items that correspond to the information associated with the user device;
   assigning a value to each of the plurality of data items that corresponds to a relative quantity of security risk associated with the each of the plurality of data items; and
   calculating the level of trust based on a sum of the values assigned to the plurality of data items.

4. The method of claim 3, where assigning the value to the each of the plurality of data items further includes:
   assigning a first value to one of the plurality of data items, where the first value indicates that the one of the plurality of data items increases a security risk associated with the user device;
   assigning a second value to another one of the plurality of data items, where the second value indicates that the other one of the plurality of data items decreases the security risk associated with the user device; and
   assigning a third value to a further one of the plurality of data items, where the third value indicates that the further one of the plurality of data items neither increases nor decreases the security risk associated with the user device.

5. The method of claim 1, further comprising:
   identifying that a potential security event, associated with another user device, has occurred based on a determination that a level of trust, associated with the other user device, is less than a threshold; and
   sending, to the proxy server and as a response to the identified potential security event, a containment notification that causes the proxy server to erase, purge, or overwrite information associated with the other user device that is stored in a memory associated with the proxy server.

6. The method of claim 5, further comprising:
   receiving, from the proxy server, a notification that the potential security event has been contained as a result of the erasing, purging, or overwriting of the information associated with the other user device; and
   sending, in response to the notification that the potential security event has been contained, information that restores the proxy server to a configuration that includes information that was stored in the memory prior to receiving an access request from the other user device.

7. The method of claim 1, further comprising:
receiving, from the proxy server, a request for services to be provided to another user device based on another access token, received by the proxy server and from the other user device, that indicates that the other user device is authorized to access the network and to receive the services; and
sending, to the proxy server, the services in response to the request for the services.

8. The method of claim 1, further comprising:
receiving, from the proxy server and at a later point in time relative to when the access token was sent to the user device via the proxy server, another request, by the user device, to access the network based on a determination, by the proxy server, that the access token has expired;
obtaining, in response to the other request, updated information associated with the user device in order to determine another level of trust associated with the user device; and
sending, to the user device via the proxy server, another access token that was generated based on the other level of trust.

9. A server device comprising:
a memory to store one or more data items corresponding to information associated with a user device; and
a processor to:
receive, from a proxy server, a request, associated with the user device, to access a network associated with the server device,
retrieve, from the memory and in response to the request, the one or more data items,
assign a respective value to each of the one or more data items and to each of at least one data item obtained from the request, where the value assigned to the each of the one or more data items and the each of at least one data item corresponds to a relative quantity of security risk associated with the user device; and
determine a level of trust, associated with the user device, based on a sum of the values assigned to the one or more data items and the at least one data item,
identify a level at which the user device is authorized to access the network based on the level of trust associated with the user device; and
send, to the proxy server, a notification that instructs the proxy server to permit the user device to access the network at the level at which the user device is authorized to access the network.

10. The server device of claim 9, where the processor is further to:
receive or generate a notification that a security event, associated with another user device, has been detected, where the notification indicates that a virus has been detected, and
send, to the proxy server and in response to the notification, an instruction for the proxy server to perform a containment operation, where the containment operation does not permit information, received from the other user device, to be sent to the server device.

11. The server device of claim 9, where the processor is further to:
receive, from the proxy server, a notification that a security event, associated with the another user device, has been detected, where the notification indicates that a virus has been detected, and
send, to the proxy server and in response to the notification, an instruction for the proxy server to delete, erase or overwrite information stored in a memory associated with the proxy server.

12. The server device of claim 11, where the processor is further to:
receive, from the proxy server, another notification that the potential security event has been contained as a result of the deleting, erasing, or overwriting of the information stored in the memory; and
send, to the proxy server and in response to the other notification, configuration information that enables the proxy server to restore the memory to a state that corresponds to a time before a communication with the other user device was received.

13. The server device of claim 9, further comprising:
a first application programming interface (API) that enables information, associated with the user device, to be processed or to be sent to or received from the user device or the proxy server; and
a second API that enables information or services, associated with the network, to be sent to or received from the user device or the proxy server.

14. The server device of claim 9, where, when assigning the respective value to the each of the one or more data items and the each of at least one data item, the processor is to:
assign a first value that increases the level of trust when a data item corresponds to a level of security risk, associated with the user device, that is less than a risk threshold, and
assign a second value that decreases the level of trust when another data item corresponds to another level of security risk, associated with the user device, that is not less than the risk threshold.

15. A non-transitory computer-readable medium containing instructions executable by at least one processor, the computer-readable medium comprising:
one or more instructions to receive, from a proxy server, a request by a user device to receive services from a network;
one or more instructions to obtain, in response to the request, information associated with the user device;
one or more instructions to assign a respective value to each of a plurality of data items that correspond to the information associated with the user device, where the assigned values correspond to a relative quantity of security risk associated with the each of the plurality of data items;
one or more instructions to determine a level of trust associated with the user device based on the assigned values, where the level of trust is a measure of security risk associated with the user device;
one or more instructions to generate a notification that directs the proxy server not to authorize the user device to access the network when the level of trust is less than a threshold;
one or more instructions to generate an access token that indicates a level to which the user device is authorized to access the network when the level of trust is not less than the threshold, where the level to which the user device is authorized to access the network corresponds to the level of trust; and
one or more instructions to send the notification or the access token to the proxy server.

16. The non-transitory computer-readable medium of claim 15, further comprising:
- one or more instructions to determine whether another level of trust, associated with another user device, is greater than a maximum threshold;
- one or more instructions to generate a first access token when the other level of trust is greater than the maximum threshold where the first access token indicates that the other user device is to be granted full access to the network; and
- one or more instructions to generate a second access token when the other level of trust is not greater than the maximum threshold, where the second access token indicates that the user device is not to be granted full access to the network.

17. The non-transitory computer-readable medium of claim 15, further comprising:
- one or more instructions to receive another access token from another user device; and
- one or more instructions to identify another level of access to which the other user device is to be authorized to access the network based on the other access token.

18. The non-transitory computer-readable medium of claim 15, further comprising:
- one or more instructions to receive another access token from another user device;
- one or more instructions to determine that the other access token has expired; and
- one or more instructions to generate another notification that directs the proxy server not to authorize the user device to access the network based on the determination that the other access token has expired.

19. The non-transitory computer-readable medium of claim 18, further comprising:
- one or more instructions to retrieve information associated with the other user device based on the determination that the other access token has expired;
- one or more instructions to determine another level of trust associated with the other user device based on the retrieved information associated with the other user device; and
- one or more instructions to send a further access token to the user device via the proxy server, where the further access token indicates a level of access that corresponds to the other level of trust.

20. The non-transitory computer-readable medium of claim 15, where the one or more instructions to obtain the information associated with the user device include:
- one or more instructions to send, to a server device, a request for the information associated with the user device; and
- one or more instructions to receive, from the server device, the information associated with the user device.

21. The non-transitory computer-readable medium of claim 15, further comprising:
- one or more instructions to detect a potential security event, associated with another user device, based on a determination that a level of trust, associated with the other user device, is less than a minimum threshold;
- one or more instructions to cause, as a result of the detection of the potential security event, information associated with the other user device, not to be received or processed; and
- one or more instructions to send, to the proxy server and as the result of the detection of the potential security event, an instruction for the proxy server to contain the information associated with the other user device, where containing the information associated with the other user device does not permit the information associated with the other user device to be sent to the network.

22. The non-transitory computer-readable medium of claim 21, further comprising:
- one or more instructions to receive, from the proxy server, a notification that the potential security event has been contained; and
- one or more instructions to send, in response to the notification that the potential security event has been contained, information that restores the proxy server to a state that existed prior to receiving an access request from the other user device.

* * * * *